United States Patent [19]
Whaley

[11] Patent Number: 5,476,299
[45] Date of Patent: Dec. 19, 1995

[54] SCOOPING SHOVEL

[76] Inventor: Arthur G. Whaley, 205 S. Railroad St., Oak Harbor, Ohio 43449-1050

[21] Appl. No.: 343,033

[22] Filed: Nov. 21, 1994

[51] Int. Cl.⁶ ........................................... A01B 1/02
[52] U.S. Cl. ........................................... 294/55
[58] Field of Search ................ 294/1.3, 49, 51, 294/53.5, 54.5, 55, 57, 59; 15/257.1, 257.2, 257.4, 257.6; 209/417–419; D8/10

[56] References Cited

U.S. PATENT DOCUMENTS

| | | | |
|---|---|---|---|
| 244,115 | 7/1881 | Dietz et al. | 15/257.1 |
| 1,012,661 | 12/1911 | Lattimore | 294/57 |
| 1,247,032 | 11/1917 | Surbaugh | 294/55 |
| 1,401,903 | 12/1921 | Gawthrop | 294/55 |
| 1,426,442 | 8/1922 | Adam | 294/49 |
| 1,564,720 | 12/1925 | Surbaugh | 294/49 |
| 2,166,013 | 7/1939 | McLindon | 294/49 |
| 2,357,114 | 8/1944 | Howe | 294/55 |
| 2,637,588 | 5/1953 | Burke | 294/55 |

FOREIGN PATENT DOCUMENTS

| | | | |
|---|---|---|---|
| 804237 | 4/1951 | Germany | 294/55 |
| 2145548 | 3/1973 | Germany | 294/49 |
| 389844 | 7/1965 | Switzerland | 15/257.1 |

Primary Examiner—Johnny D. Cherry

[57] ABSTRACT

A shovel for scooping and retaining fluids and debris. The inventive device includes a receiving shovel assembly including a retaining plate partially enclosing a shovel blade. A handle assembly extends from the shovel assembly for facilitating manual manipulation of the device in scooping fluids and debris from a ground surface.

1 Claim, 4 Drawing Sheets

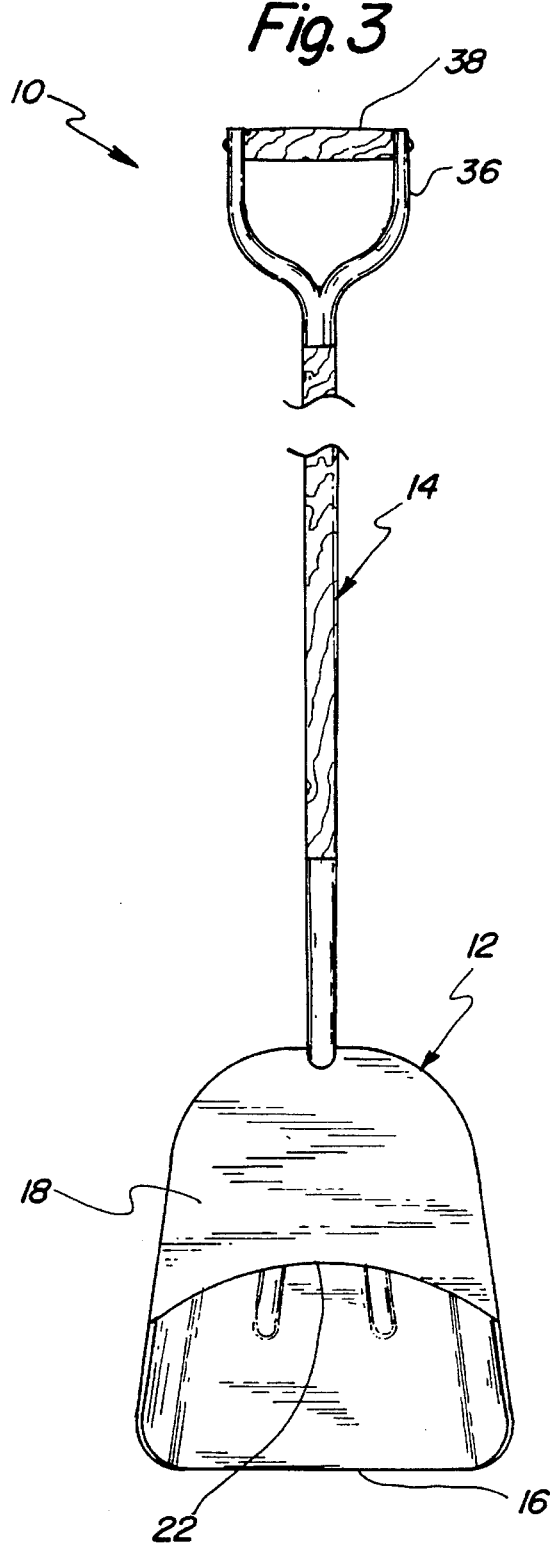
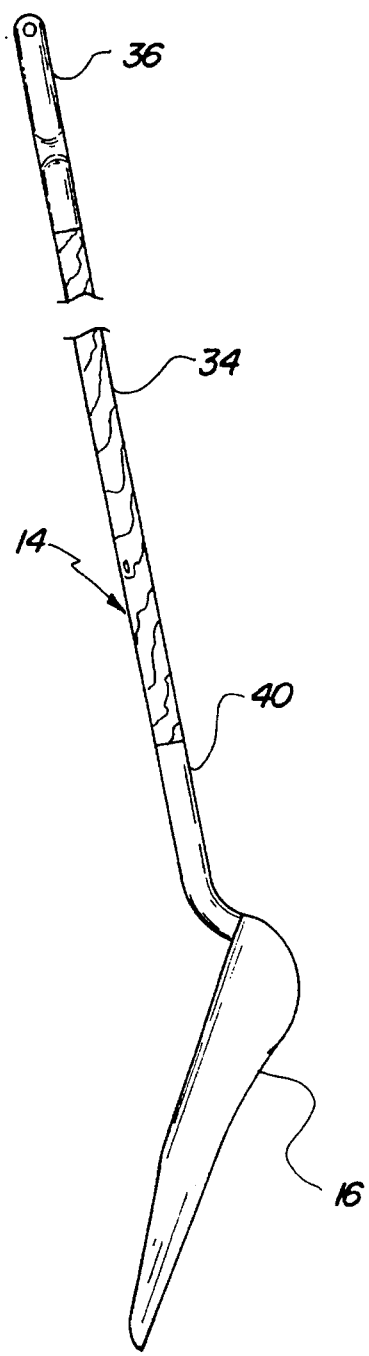

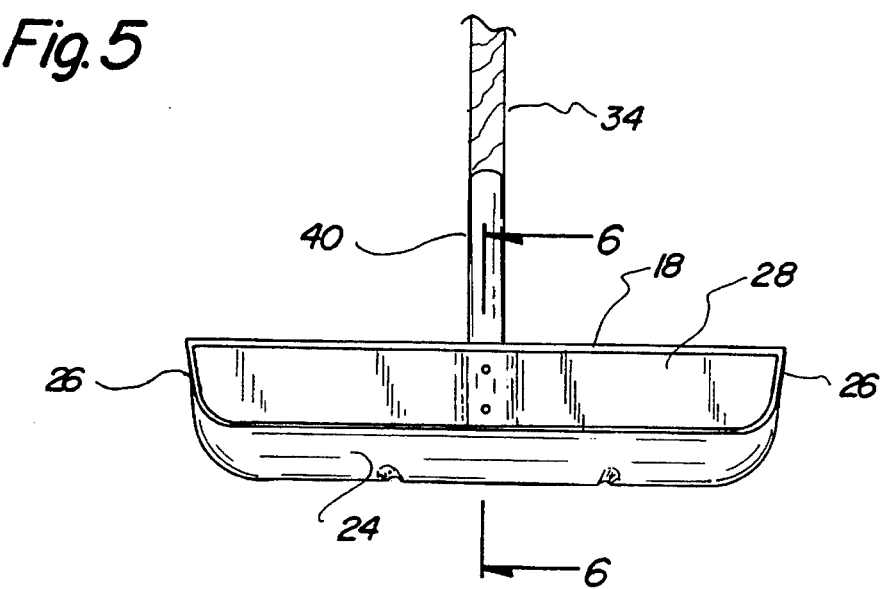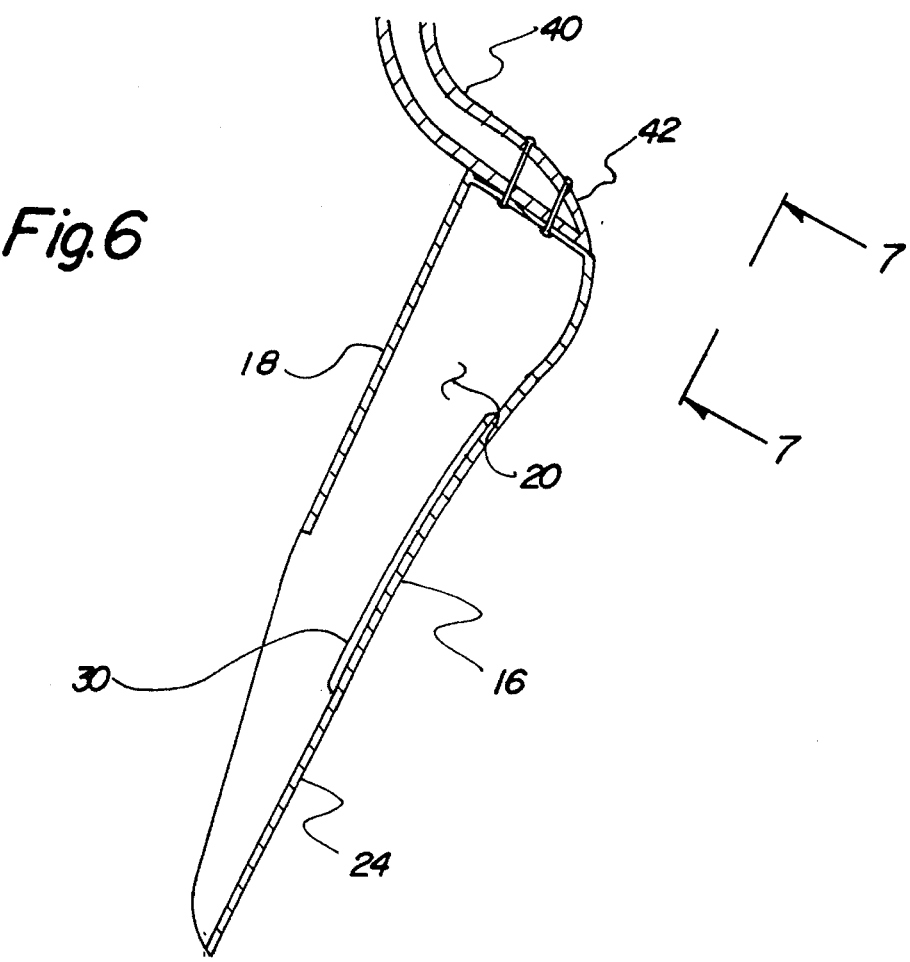

SCOOPING SHOVEL

BACKGROUND OF THE INVENTION

1. Field of the Invention

The present invention relates to shovel implements and more particularly pertains to a scooping shovel for scooping and retaining fluids and other debris from a ground surface.

2. Description of the Prior Art

The use of shovel implements is known in the prior art. More specifically, shovel implements heretofore devised and utilized are known to consist basically of familiar, expected and obvious structural configurations, notwithstanding the myriad of designs encompassed by the crowded prior art which have been developed for the fulfillment of countless objectives and requirements.

Known prior art shovel implements include U.S. Pat. Nos. 4,198,090; 4,129,327; 3,583,746; U.S. Pat. Nos. Des. 270,562; 267,772; and 262,686.

While these devices fulfill their respective, particular objectives and requirements, the aforementioned patents do not disclose a scooping shovel for scooping and retaining fluids and debris from a ground surface which includes a receiving shovel assembly having a retaining plate partially enclosing a shovel blade, and a handle assembly extending from the shovel assembly for facilitating manual manipulation of the device.

In these respects, the scooping shovel according to the present invention substantially departs from the conventional concepts and designs of the prior art, and in so doing provides an apparatus primarily developed for the purpose of scooping and retaining fluids and debris from a ground surface.

SUMMARY OF THE INVENTION

In view of the foregoing disadvantages inherent in the known types of shovel implements now present in the prior art, the present invention provides a new scooping shovel construction wherein the same can be utilized for scooping and retaining fluids and debris from a ground surface. As such, the general purpose of the present invention, which will be described subsequently in greater detail, is to provide a new scooping shovel apparatus and method which has many of the advantages of the shovel implements mentioned heretofore and many novel features that result in a scooping shovel which is not anticipated, rendered obvious, suggested, or even implied by any of the prior art shovel implements, either alone or in any combination thereof.

To attain this, the present invention generally comprises a shovel for scooping and retaining fluids and debris. The inventive device includes a receiving shovel assembly including a retaining plate partially enclosing a shovel blade. A handle assembly extends from the shovel assembly for facilitating manual manipulation of the device in scooping fluids and debris from a ground surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new scooping shovel apparatus and method which has many of the advantages of the shovel implements mentioned heretofore and many novel features that result in a scooping shovel which is not anticipated, rendered obvious, suggested, or even implied by any of the prior art shovel implements, either alone or in any combination thereof.

It is another object of the present invention to provide a new scooping shovel which may be easily and efficiently manufactured and marketed.

It is a further object of the present invention to provide a new scooping shovel which is of a durable and reliable construction.

An even further object of the present invention is to provide a new scooping shovel which is susceptible of a low cost of manufacture with regard to both materials and labor, and which accordingly is then susceptible of low prices of sale to the consuming public, thereby making such scooping shovels economically available to the buying public.

Still yet another object of the present invention is to provide a new scooping shovel which provides in the apparatuses and methods of the prior art some of the advantages thereof, while simultaneously overcoming some of the disadvantages normally associated therewith.

Still another object of the present invention is to provide a new scooping shovel for scooping and retaining fluids and debris from a ground surface.

Yet another object of the present invention is to provide a new scooping shovel which includes a receiving shovel assembly having a retaining plate partially enclosing a shovel blade, and a handle assembly extending from the shovel assembly for facilitating manual manipulation of the device.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevation view of a scooping shovel according to the present invention.

FIG. 4 is a side elevation view thereof.

FIG. 5 is an elevation view the present invention as seen from line 5—5 of FIG. 3.

FIG. 6 is a cross sectional view taken along line 6—6 of FIG. 5.

DESCRIPTION OF THE PREFERRED EMBODIMENT

Figure 1:
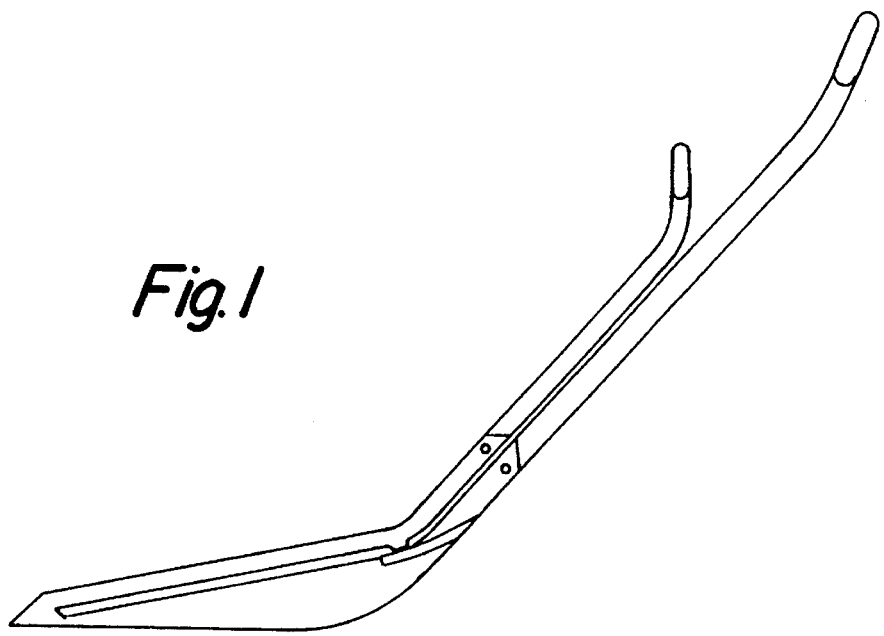
FIG. 1 is a side elevation view of a prior art shovel implement.

With reference now to the drawings, and in particular to FIGS. 3-8 thereof, a new scooping shovel embodying the principles and concepts of the present invention and generally designated by the reference numeral 10 will be described.

Figure 2:
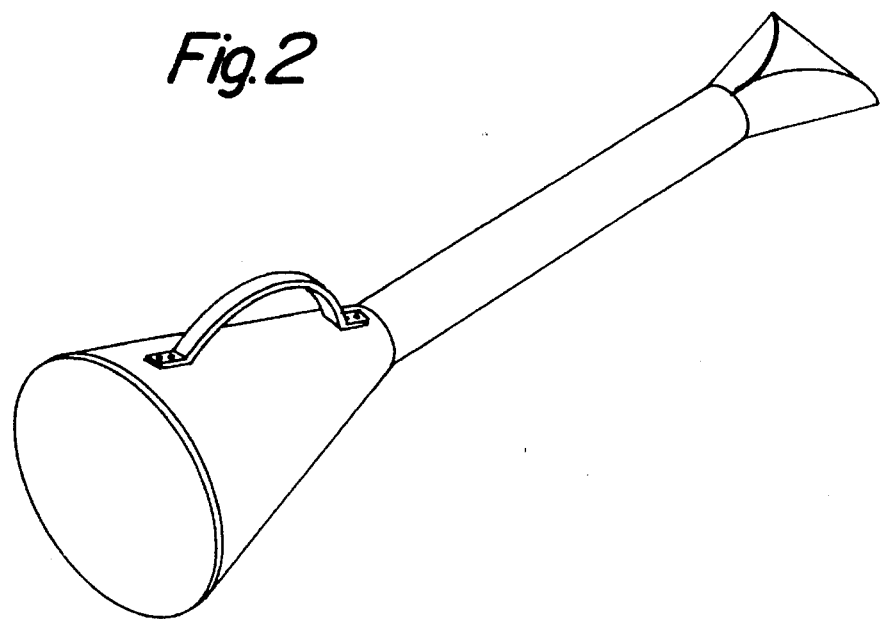
FIG. 2 is an isometric illustration of a further prior art shovel implement.

Turning initially to FIGS. 1 and 2 wherein prior art shovel implements are illustrated, it can be shown that the prior art teaches a shovel having a pivotally mounted u-shaped forked member extending within the shovel blade, as shown in FIG. 1, or a container having a nozzle extending therefrom, as shown in FIG. 2.

Turning now to FIGS. 3 through 8 wherein the present invention 10 is illustrated in detail, it can be shown that the scooping shovel substantially departs from the designs and concepts of the prior art and includes a receiving shovel means 12 for scooping and retaining fluids and debris from a ground surface. A handle means 14 is coupled to the receiving shovel means 12 for facilitating manual manipulation of the receiving shovel means during operation of the device 10.

As best illustrated in FIGS. 3 through 8, it can be shown that the receiving shovel means 12 according to the present invention 10 comprises a shovel blade 16 having a retaining plate 18 extending across upper edges of the shovel blade so as to form an interior compartment 20 within a portion of the shovel blade. The retaining plate 18 is preferably shaped so as to define an arcuate front edge 22 which operates to preclude sloshing of fluid from the shovel blade 16 proximal to laterally opposed edges thereof. As shown in FIG. 5, the shovel blade 16 preferably comprises a base plate 24 having a pair of opposed lateral walls 26 projecting upwardly from opposed lateral edges of the base plate. A rear wall 28 extends between the lateral walls 26 and cooperates with the retaining plate 18, the lateral walls 26, and the base plate 24 to define the interior compartment 20 of the shovel blade 16.

Figure 7:
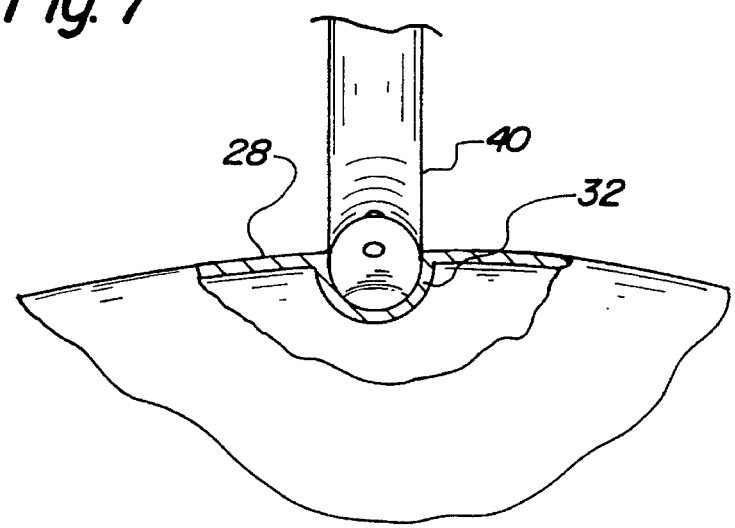
FIG. 7 is a bottom plan view, partially in cross section, as viewed from line 7—7 of FIG. 6.
Figure 8:
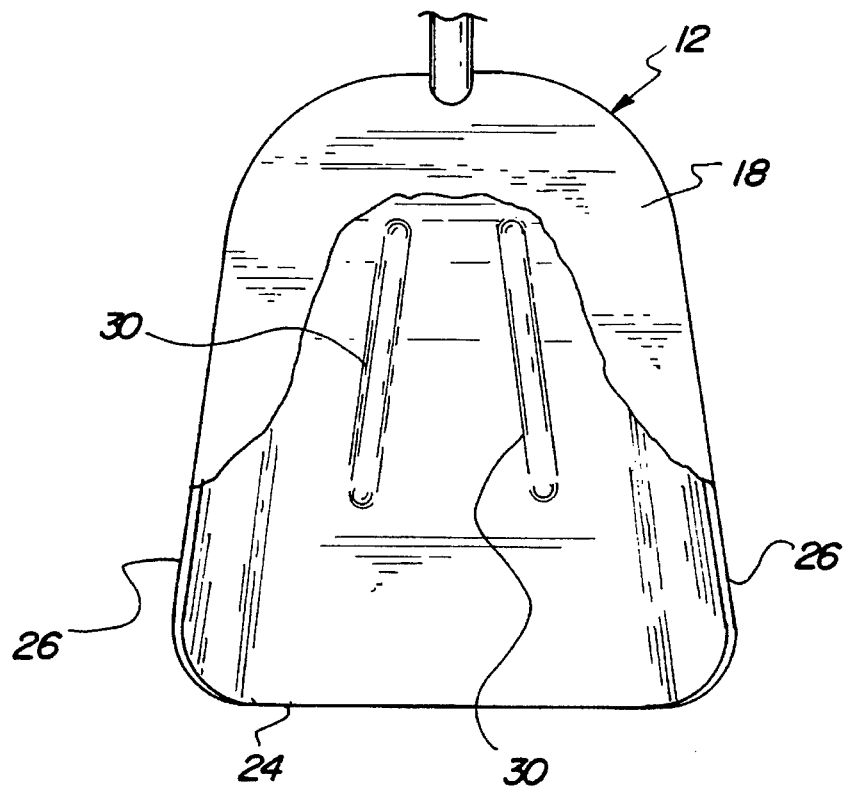
FIG. 8 is a top plan view, partially in cross section, of a receiving shovel means comprising a portion of the present invention.

Preferably, the shovel blade 16 is formed from a single stamping of steel or like metal. As shown in FIG. 8, the base plate 24 of the shovel blade can be shaped so as to define a pair of non-contiguously formed linear of reinforcing ribs 30 extending therealong and oriented at an oblique angle relative to one another so as to impart both lateral and longitudinal stability to the construction of the shovel blade 16. As shown in FIG. 7, the rear wall 28 of the shovel blade 16 is preferably shaped so as to define an integral mounting recess 32 within which a portion of the handle means 14 is mounted to the receiving shovel means As shown in FIGS. 3 and 4, the handle means according to the present invention 10 comprises an elongated handle 34 having a U-shaped handle tube mount 36 mounted to an upper end thereof, with a handle tube 38 extending between spaced furcations of the U-shaped handle tube mount 36. The elongated handle 34 of the handle means 14 extends from the U-shaped handle tube mount 36 and terminates at a lower end thereof whereat a shovel mounting tube 40 is fixedly secured thereto. As shown in FIG. 6 and 7, the shovel mounting tube 40 is mounted within the interior mounting recess 32 of the rear wall 28 by a pair of unlabeled rivets extending through both the shovel mounting tube and the rear wall 28. Preferably, the shovel mounting tube 40 is shaped so as to define an arcuate taper 42 continuing into the base plate 24 of the shovel blade 16. The arcuate taper 42 precludes unintentional engagement of the shovel mounting tube 40 with a ground surface over which the scooping shovel 10 is traversed during use thereof.

In use, the scooping shovel 10 according to the present invention can be utilized for scooping and retaining fluids and other debris from a ground surface. As shown in FIG. 6, the shovel blade 16 is shaped such that a distance between the base plate 24 and the retaining plate 18 proximal to the rear wall 28 thereof is substantially greater than a distance between the base plate 24 and the retaining plate 18 proximal to the arcuate front edge 22 of the retaining shovel means 12. In this configuration, fluids and debris retained within the interior compartment 20 of the receiving shovel means 12 are encouraged to reside within the interior compartment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A scooping shovel comprising:

a receiving shovel means for scooping and retaining fluids and debris from a ground surface, the receiving shovel means comprising a shovel blade having a retaining plate extending across upper edges of the shovel blade so as to form an interior compartment within a portion of the shovel blade, the shovel blade comprising a base plate having a pair of opposed lateral walls projecting upwardly from opposed lateral edges of the base plate; and a rear wall extending between the lateral walls and cooperating with the retaining plate, the lateral walls, and the base plate to define the interior compartment of the shovel blade, the retaining plate being shaped so as to define an arcuate front edge which operates to preclude sloshing of fluid from the shovel blade proximal to laterally opposed edges thereof, the base plate of the shovel blade being shaped so as to define a pair of non-contiguously formed linear reinforcing ribs extending therealong and oriented at an oblique angle relative to one another imparting lateral and longitudinal stability; and, a handle means coupled to the receiving shovel means for facilitating manual manipulation of the receiving shovel means, the rear wall of the shovel blade being shaped so as to define an integrally formed interior mounting recess within which a portion of the handle means is mounted to the receiving shovel means, the handle means comprises an elongated handle having upper and lower ends; a U-shaped handle tube mount secured to the upper end of the elongated handle, the handle tube mount having a bifurcated end; a handle tube secured between spaced furcations of the U-shaped handle tube mount; a shovel mounting tube fixedly secured to the lower end of the elongated handle, the shovel mounting tube being mounted within the interior mounting recess of the rear wall, the shovel mounting tube being shaped so as to define an arcuate taper continuing into contiguous communication with the base plate of the shovel blade by a plurality of rivets, this configuration precluding unintentional engagement of the shovel mounting tube with a ground surface over which the scooping shovel is traversed during use thereof.

* * * * *